US007835363B2

(12) United States Patent
Lund et al.

(10) Patent No.: US 7,835,363 B2
(45) Date of Patent: Nov. 16, 2010

(54) METHOD AND SYSTEM TO PROVIDE BLADE SERVER LOAD BALANCING USING SPARE LINK BANDWIDTH

(75) Inventors: Martin Lund, Menlo Park, CA (US); Howard Baumer, Laguna Hills, CA (US)

(73) Assignee: Broadcom Corporation

( * ) Notice: Subject to any disclaimer, the term of this patent is extended or adjusted under 35 U.S.C. 154(b) by 2104 days.

(21) Appl. No.: 10/665,648

(22) Filed: Sep. 19, 2003

(65) Prior Publication Data

US 2004/0202182 A1 Oct. 14, 2004

Related U.S. Application Data

(63) Continuation-in-part of application No. 10/454,012, filed on Jun. 4, 2003, and a continuation-in-part of application No. 10/454,273, filed on Jun. 4, 2003, now Pat. No. 6,859,154.

(60) Provisional application No. 60/462,845, filed on Apr. 15, 2003, provisional application No. 60/448,703, filed on Feb. 18, 2003, provisional application No. 60/446,894, filed on Feb. 12, 2003, provisional application No. 60/462,873, filed on Apr. 15, 2003.

(51) Int. Cl.
  *H04L 12/26* (2006.01)
  *H04J 1/16* (2006.01)
  *G08C 15/00* (2006.01)
  *G06F 11/00* (2006.01)
  *G01R 31/08* (2006.01)
(52) U.S. Cl. .................. 370/395; 370/230; 370/252; 370/237; 709/208; 709/225
(58) Field of Classification Search .......... 370/230–342, 370/386–395, 351–360, 463–468; 709/203–219, 709/223–249
See application file for complete search history.

(56) References Cited

U.S. PATENT DOCUMENTS

| 6,570,855 | B1 * | 5/2003 | Kung et al. ................. 370/237 |
| 6,810,018 | B2 * | 10/2004 | Paranchych et al. ......... 370/252 |
| 6,988,138 | B1 * | 1/2006 | Alcorn et al. ............... 709/225 |
| 7,032,037 | B2 * | 4/2006 | Garnett et al. ................. 710/2 |
| 7,046,668 | B2 * | 5/2006 | Pettey et al. ................ 370/392 |
| 7,062,556 | B1 * | 6/2006 | Chen et al. .................. 709/226 |
| 7,085,961 | B2 * | 8/2006 | Chang et al. .................. 714/13 |
| 7,219,183 | B2 * | 5/2007 | Pettey et al. ................ 710/316 |
| 7,243,145 | B1 * | 7/2007 | Poortman .................... 709/223 |
| 7,443,857 | B1 * | 10/2008 | Hsu et al. ................ 370/395.1 |
| 2002/0124114 | A1 * | 9/2002 | Bottom et al. .............. 709/251 |
| 2002/0188718 | A1 * | 12/2002 | McGraw et al. ............. 709/224 |
| 2003/0097428 | A1 | 5/2003 | Afkhami et al. |
| 2003/0105859 | A1 * | 6/2003 | Garnett et al. .............. 709/224 |

(Continued)

FOREIGN PATENT DOCUMENTS

GB 2016247 A 9/1979

OTHER PUBLICATIONS

White Paper Alteon Web Systems, "The Next Step in Server Load Balancing", X, Nov. 1999, pp. 1-15, I, XP002974311.
EDN Electrical Design News, "10-Gigabit Ethernet Takes On Sonet", Cahners Publishing Co., Newton, MA, USA, vol. 46 No. 14, Jun. 21, 2001, pp. 81-82, 84, 86, XP001162653, ISSN: 0012-7515.

*Primary Examiner*—Man Phan
(74) *Attorney, Agent, or Firm*—McAndrews, Held & Malloy, Ltd.

(57) ABSTRACT

A blade server with an improved method and apparatus for controlling the capacity utilization of the servers is disclosed. Capacity utilization information is obtained from blade servers mounted on a common backplane. The servers provide information concerning capacity utilization using spare link bandwidth without polling or the use of special messages. The blade manager then allocates network traffic based on a utilization algorithm in order to balance the capacity of the server in an efficient manner.

25 Claims, 12 Drawing Sheets

U.S. PATENT DOCUMENTS

| | | | |
|---|---|---|---|
| 2004/0024831 A1* | 2/2004 | Yang et al. | 709/208 |
| 2004/0054656 A1* | 3/2004 | Leung et al. | 707/1 |
| 2004/0054780 A1* | 3/2004 | Romero | 709/226 |
| 2004/0081104 A1* | 4/2004 | Pan et al. | 370/254 |
| 2004/0160900 A1* | 8/2004 | Lund et al. | 370/252 |
| 2004/0199567 A1* | 10/2004 | Lund | 709/201 |
| 2004/0199568 A1* | 10/2004 | Lund | 709/201 |
| 2004/0199569 A1* | 10/2004 | Kalkunte et al. | 709/201 |
| 2004/0264398 A1* | 12/2004 | Chu et al. | 370/312 |
| 2006/0129687 A1* | 6/2006 | Goldszmidt et al. | 709/229 |
| 2006/0167886 A1* | 7/2006 | Kantesaria et al. | 707/10 |

\* cited by examiner

METHOD AND SYSTEM TO PROVIDE BLADE SERVER LOAD BALANCING USING SPARE LINK BANDWIDTH

PRIOR APPLICATIONS UNDER 35 U.S.C. §120

This application is a continuation-in-part of U.S. patent application Ser. Nos. 10/454,012 filed on Jun. 4, 2003 and 10/454,273 filed on Jun. 4, 2003 now U.S. Pat. No. 6,859,154.

PRIOR PROVISIONAL APPLICATIONS UNDER 35 U.S.C. §119(e)

This application claims the benefit of the following U.S. Provisional Applications:

Provisional Application No. 60/462,845 filed on Apr. 15, 2003.

Provisional Application No. 60/448,703 filed on Feb. 18, 2003.

Provisional Application No. 60/446,894 filed on Feb. 12, 2003.

Provisional Application No. 60/462,873 filed on Apr. 15, 2003.

INCORPORATION BY REFERENCE

The complete subject matter of the following applications are hereby incorporated by reference:

U.S. patent application Ser. No. 10/454,273, filed on Jun. 4, 2003 and U.S. patent application Ser. No. 10/454,012 filed on Jun. 4, 2003.

FEDERALLY SPONSORED RESEARCH OR DEVELOPMENT

[Not Applicable]

SEQUENCE LISTING

[Not Applicable]

MICROFICHE/COPYRIGHT REFERENCE

[Not Applicable]

BACKGROUND OF THE INVENTION

A server is essentially a computer that is able to access files and provide communications, printing, and other services that are available to users of a network. A special network operating system may run on a dedicated server in a large network, or a PC (personal computer) operating system may run on a non-dedicated server having peer-to-peer networking software running on top.

Compared to a single user workstation, a server usually comprises a more advanced CPU, a larger memory, a larger cache, and more disk storage space. A server may have multiple processors where each processor is dedicated to a particular support function such as, for example, e-mail, printing, and communications. Servers may also comprise large power supplies, UPS (uninterruptible power supply) capability, and various fault tolerant features such as that provided by RAID (redundant array of independent disks) technology.

Typically, a single server exists in a standalone box and interfaces to a network. Multiple standalone boxes of servers may be co-located and each connected to a network. Each server typically interfaces to the network separately at a particular data rate such as 1 Gb/s for Gigabit Ethernet or 10 Gb/s for 10 Gigabit Ethernet.

A single standalone server may act as a server manager and allocate traffic to other standalone servers on a network. For example, a server manager may distribute server traffic in a round robin manner to other servers (i.e., distributing traffic to one server and then the next in order). However, this does not account for the true load of a given server and is not very efficient.

Alternatively, a server manager may periodically poll the other standalone servers asking for their load status (e.g., a number of active sessions). As a result, the server manager may use the status information to determine when to send additional traffic to a particular server. However, the polling process adds to the overall load of the servers.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A method and system are provided to allow blade server load balancing using spare link bandwidth in a multi-server platform having a common switch backplane. The method may include the steps of receiving digital information on a digital communications link at a blade server manager, receiving capacity utilization information embedded in spare link bandwidth from a plurality of blade servers connected to the blade server manager, selecting a blade server to receive the digital information based on a load balancing algorithm, and forwarding the received information to the selected blade server. The capacity information may be blade server percent CPU utilization, interrupt utilization, or other suitable capacity metric. The manager may be connected to an external network at a link data rate of 10 Gigabits per second, while the blade servers are connected to the manager over 1 Gigabit per second dedicated links. The utilization information may be embedded in frame alignment information by using more than one valid alignment symbol. Additional information may be embedded by adding additional embedded control characters.

These and other advantages, aspects and novel features of the present invention, as well as details of an illustrated embodiment thereof, will be more fully understood from the following description and drawings.

DETAILED DESCRIPTION OF THE INVENTION

Certain embodiments of the present invention relate to load balancing among servers. In particular, certain embodiments of the present invention relate to providing blade server load balancing using spare link bandwidth in a multi-server platform having a single switch backplane.

Figure 1:
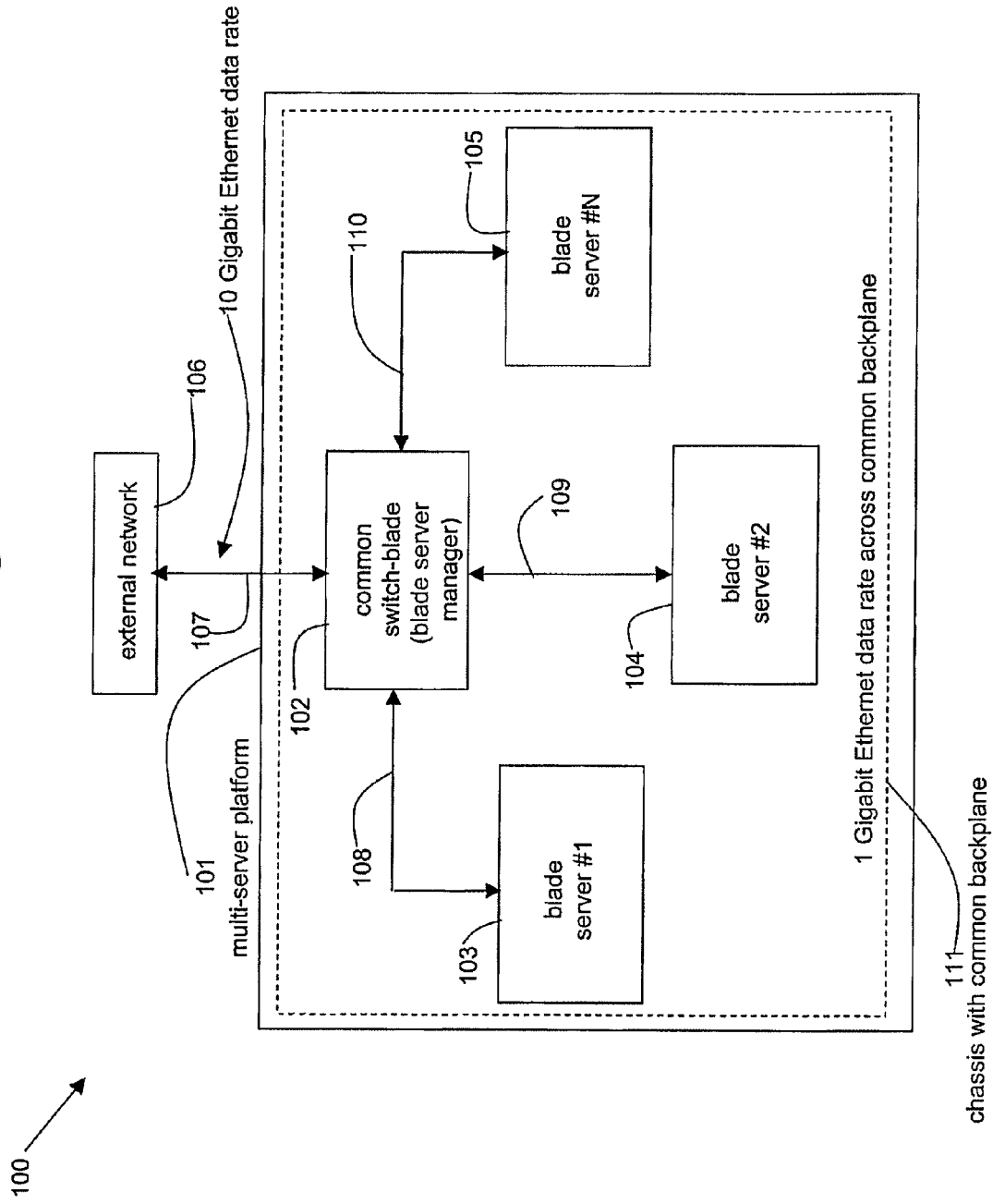
FIG. 1 is a diagram illustrating an embodiment of a communication system comprising a multi-server platform that performs load balancing, in accordance with various aspects of the present invention.

FIG. 1 is a diagram illustrating an embodiment of a communication system 100 comprising a multi-server platform 101 that performs load balancing, in accordance with various aspects of the present invention. The multi-server platform 101 comprises a chassis with a common backplane 111, a common switch-blade 102 acting as a blade server manager, a blade server #1 103, a blade server #2 104, and up to and including a blade server #N 105, where N may be any integer number.

Each of the blade servers (#1 to #N) is a server on a single card or blade that plugs into the chassis with a common backplane 111. The chassis with a common backplane 111 provides a single installation box for the multiple blade servers (#1 to #N) and provides a common backplane interface (e.g., 108, 109, 110) between each blade server (e.g., 103, 104, 105) and the common switch-blade 102, where the common backplane interfaces (e.g., 108, 109, 110) are part of the common backplane 111. Such a configuration allows for an increased density of servers, easier management of the multiple servers (i.e., only one installation box needs to be serviced), scalability (i.e., more blade servers may be added over time), and better reliability.

The common switch-blade 102 comprises N+1 interfaces and performs packet switching of data frames between the N blade servers and an external network 106, in accordance with an embodiment of the present invention. The common switch-blade 102 acts as a blade server manager by distributing data traffic to the server blades (#1 to #N) to balance the load of data traffic among the blade servers. The common switch-blade 102 interfaces to each of the N server blades over the common backplane 111 and also interfaces to the external network 106 (thus, N+1 interfaces).

In accordance with an embodiment of the present invention, the switch-blade 102 communicates with each of the N blade servers independently over the common backplane 111. For example, blade server #1 103 communicates bi-directionally with the common switch-blade 102 via the common backplane interface 108. The blade server #2 104 communicates bi-directionally with the common switch-blade 102 via the common backplane interface 109. The blade server #N 105 communicates bi-directionally with the common switch-blade 102 via the common backplane interface 110. Each common backplane interface shares space on the backplane 111 but may be separate from the interface from the other blade servers.

Figure 2:
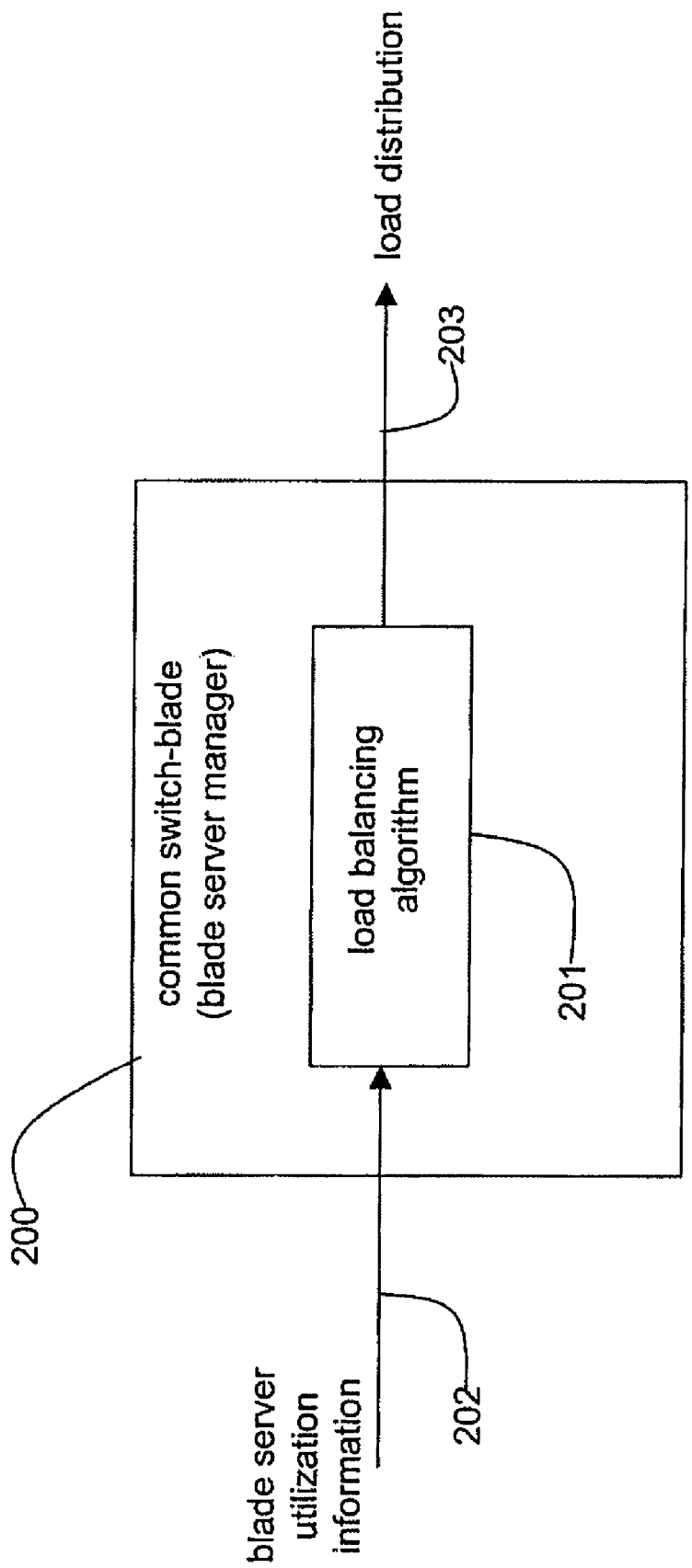
FIG. 2 is a diagram illustrating an embodiment of a switch-blade comprising a load balancing algorithm and acting as a blade server manager within the multi-server platform of FIG. 1, in accordance with various aspects of the present invention.

FIG. 2 is a diagram illustrating an embodiment of a switch-blade 200 comprising a load balancing algorithm 201 and acting as a blade server manager within the multi-server platform 101 of FIG. 1, in accordance with various aspects of the present invention. The switch-blade 200 receives blade server utilization information 202 from the various blade servers (e.g., blade server #1 to #N). The load balancing algorithm 201 within the switch-blade 200 uses the blade server utilization information to generate a load distribution 203. The load distribution 203 defines how the switch-blade 200 will currently distribute server data traffic among the blade servers within the multi-server platform 101.

Figure 3:
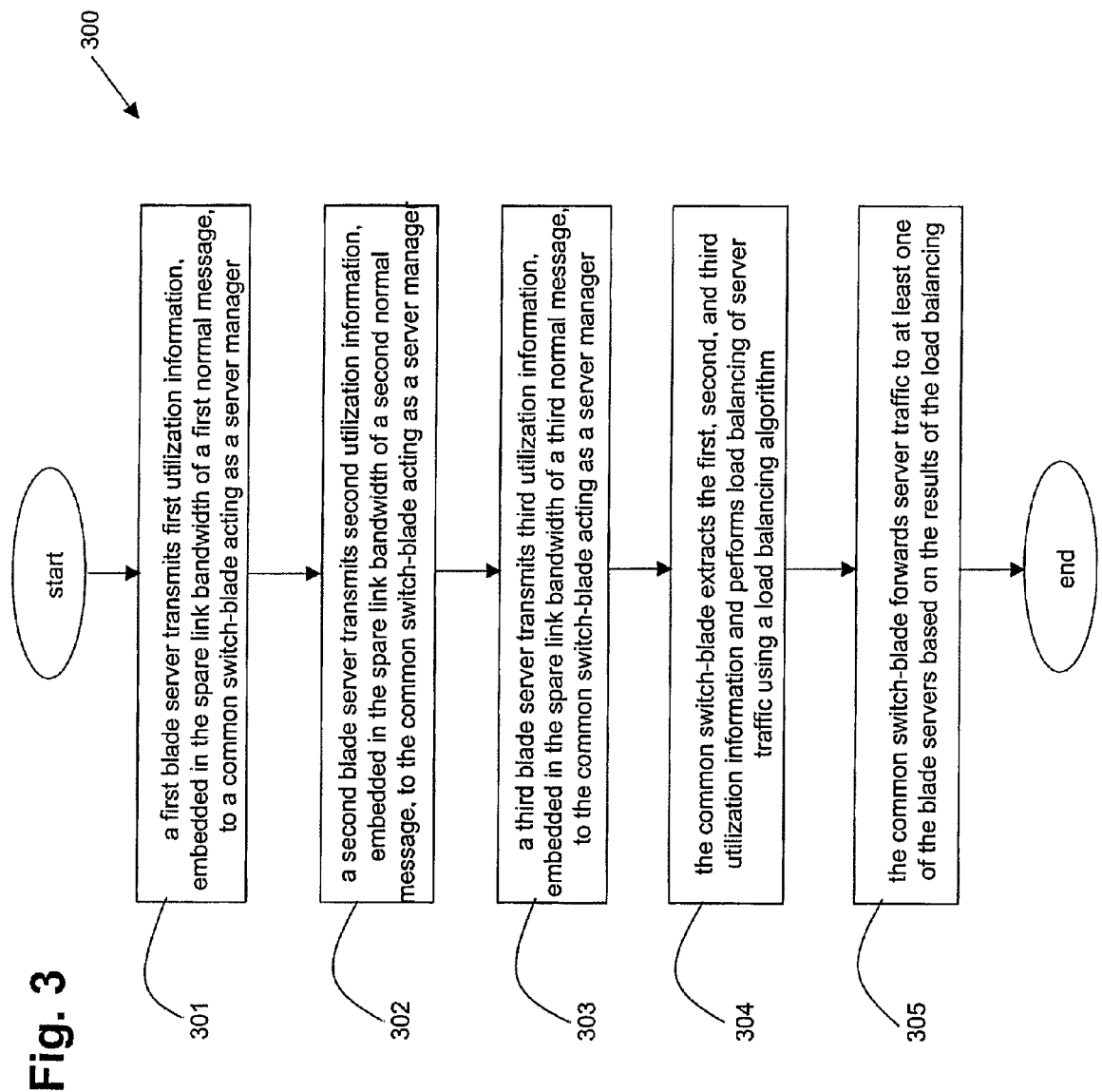
FIG. 3 is a flowchart illustrating an embodiment of a method to perform load balancing in the multi-server platform of FIG. 1, in accordance with various aspects of the present invention.
Figure 4:
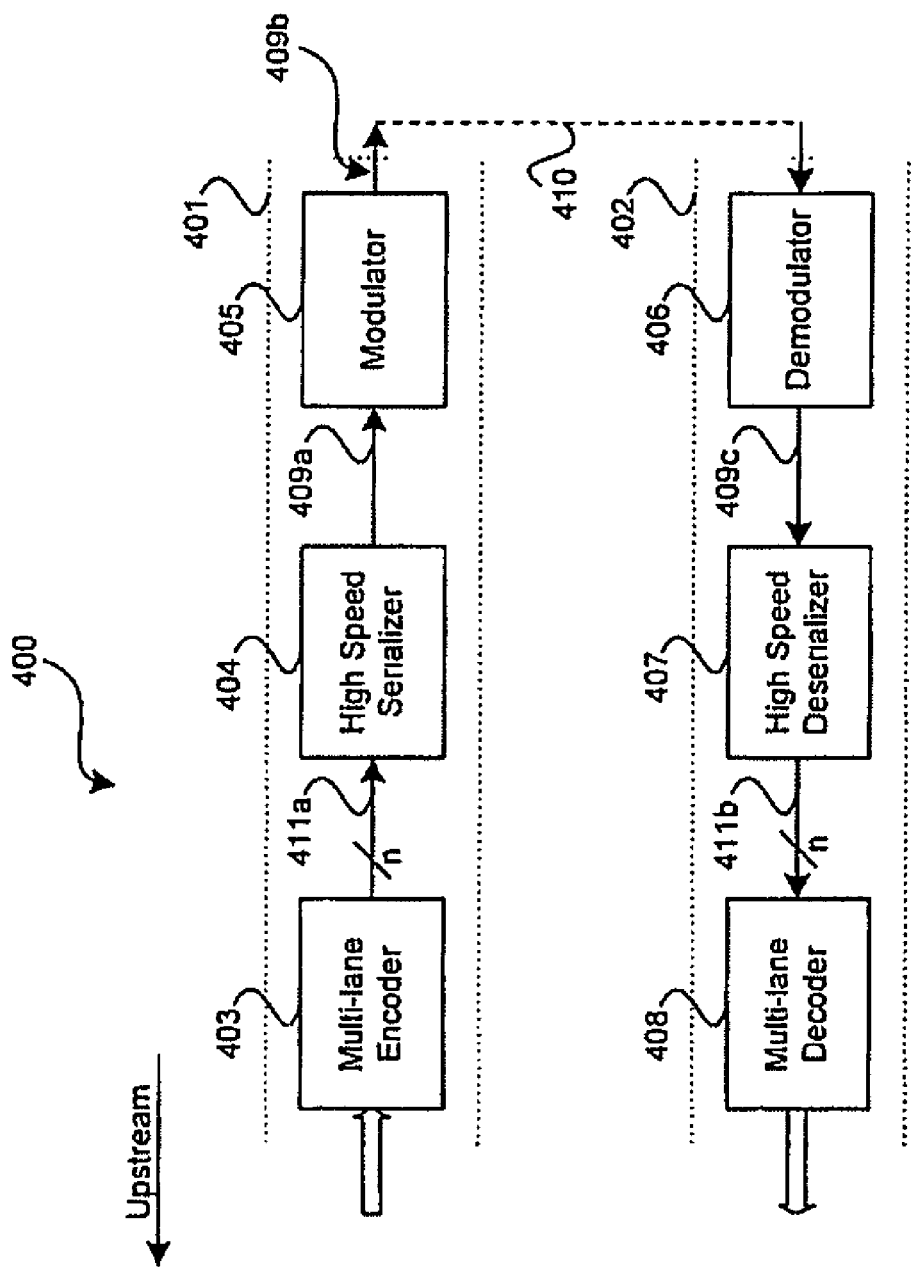
FIG. 4 is a diagram illustrating an embodiment of a current multilane digital communication link.

FIG. 3 is a flowchart illustrating an embodiment of a method 300 to perform load balancing in the multi-server platform 101 of FIG. 1, in accordance with various aspects of the present invention. In step 301, a first blade server transmits first utilization information, embedded in the spare link bandwidth of a first normal message, to a common switch-blade acting as a server manager. In step 302, a second blade server transmits second utilization information, embedded in the spare link bandwidth of a second normal message, to the common switch-blade acting as a server manager. In step 303, a third blade server transmits third utilization information, embedded in the spare link bandwidth of a third normal message, to the common switch-blade acting as a server manager. In step 304, the common switch-blade extracts the first, second, and third utilization information and performs load balancing of server traffic using a load balancing algorithm. In step 305, the common switch-blade forwards server traffic to at least one of the blade servers based on the results of the load balancing. The switch-blade, acting as the blade server manager, does not poll the blade servers for utilization information.

Spare link bandwidth refers to any normally unutilized or underutilized bandwidth in a communication link between a blade server and a switch-blade acting as a server manager. For example, an overlay channel or frame alignment data.

Figure 5:
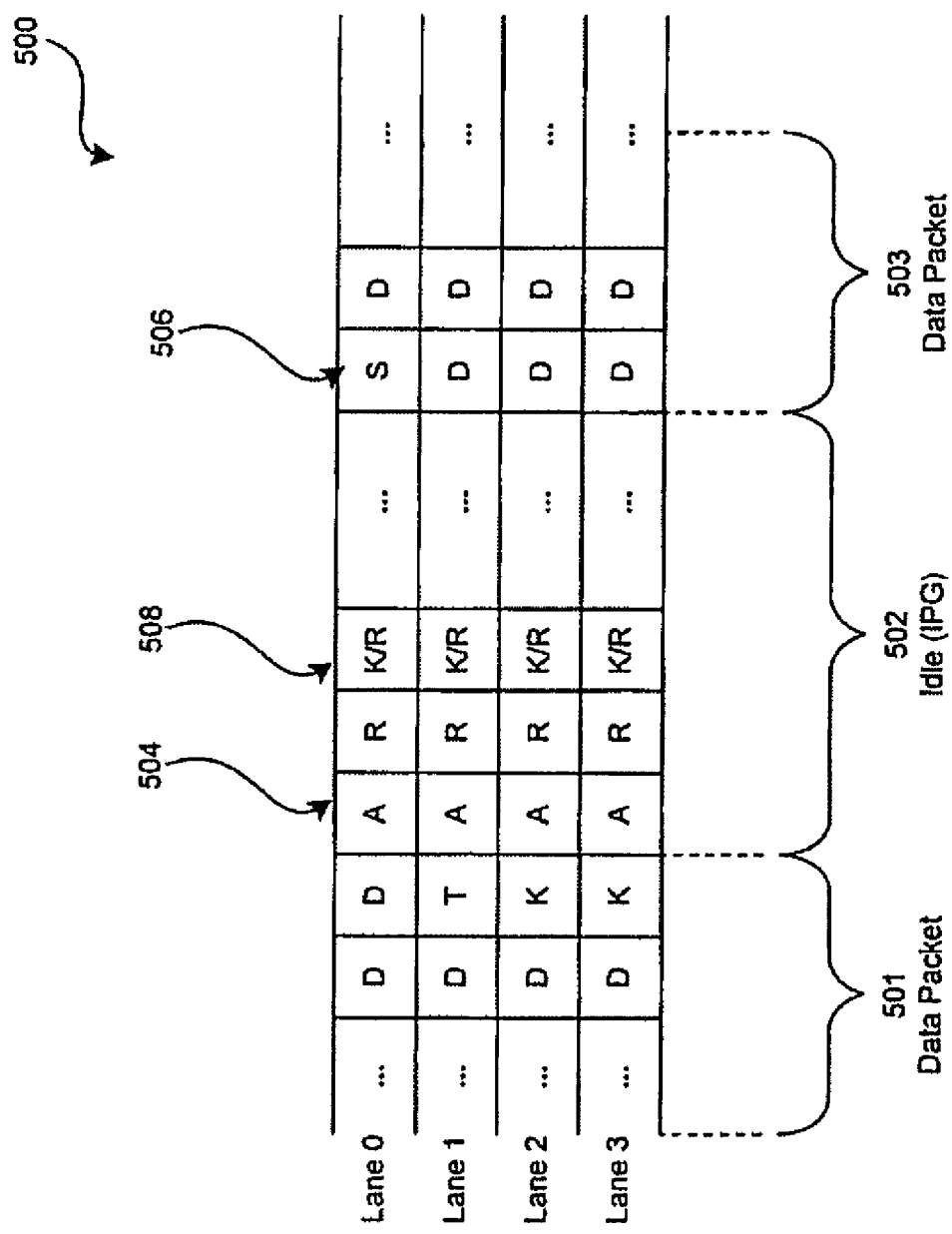
FIG. 5 is a diagram that illustrates an example of a XAUI parallel lane structure 200 for 10 gigabit (10G) BASE-X operation comprising four lanes.

To embed utilization information in frame alignment data, reference is made to FIG. 5. FIG. 5 shows a 10 G Base-X parallel lane structure, however other frame formats at higher or lower data rates may be used.

Referring to FIG. 5, the XAUI parallel lane structure 500 may include a first lane (lane 0), a second lane (lane 1), a third lane (lane 2) and a fourth lane (lane 3). The XAUI parallel lane structure 500 depicts the end of a first data packet 501, an inter-packet-gap (IPG) or idle 502 and a first portion of a second data packet 503.

The data word bytes in the data packets may be designated by /D/. The end-of-packet (EOP) word may be designated by the control character /T/ and may indicate the end of a data packet. The SOP (start-of-packet) word may be designated by the control character /S/ and may indicate the start of a data packet. The control character /K/ may indicate a comma and may be utilized for byte alignment. The control character /A/ may be utilized to indicate an alignment character that may be used for lane alignment. The control character /R/ may indicate a carrier extend and may be utilized to separate packets within a burst of packets. In certain instances, the control character /R/ may be utilized for code-group alignment. In this regard, the control character /R/ may be used to ensure proper code-group alignment of a first idle character occurring after a packet has been transmitted. The IPG or idle packet 502 preferably includes control characters such as /A/, /K/, and /R/. Consequently, the IPG or idle packet 502 does not include data characters.

The various control characters in each of the parallel lanes, lane 0, lane 1, lane 2 and lane 3 may be part of the transmission protocol utilized by standardized 10G BASE-X transmission. In accordance with current 10G standards and protocols, there are 12 control characters or special code groups.

Figure 6:
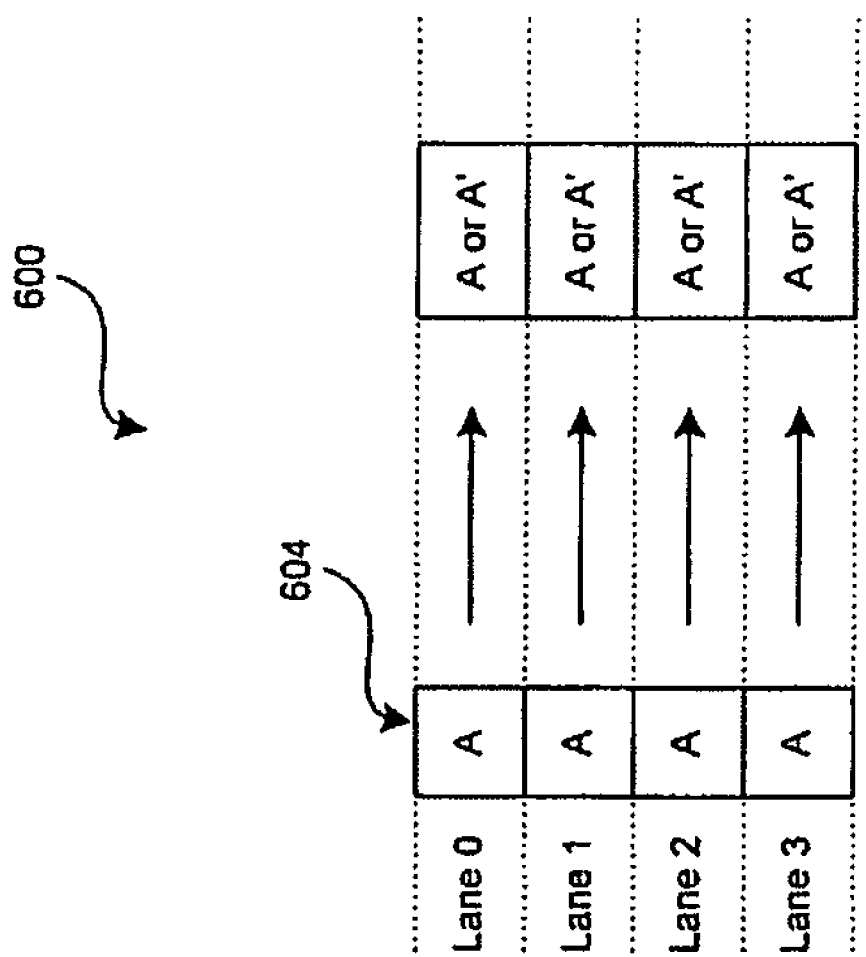
FIG. 6 is a diagram illustrating an embodiment of an enhanced encoding method specifically showing the encoding of lane alignment control characters /A/, in accordance with an embodiment of the invention.

FIG. 6 is a diagram 600 illustrating an embodiment of an enhanced encoding method specifically showing the encoding of lane alignment control characters /A/, in accordance with an embodiment of the invention. The lane alignment control character /A/ is a character that may appear in each of the lanes of a multi-lane transmission. The lane alignment control character /A/ may be utilized to align the parallel lanes with each other. In the case of a XAUI, the lane alignment control character may be utilized to align each of lane 0, lane 1, lane 2 and lane 3 with each other. Referring to FIG. 5, reference 504 illustrates an exemplary lane alignment characters in each of the XAUI lanes, lane 0, lane 1, lane 2 and lane 3.

In an embodiment of the invention, the lane alignment control character may not be limited to the /A/ control character. Accordingly, the protocol may include a lane alignment character that may have at least two control characters. In this regard, the lane alignment character /A/ may be combined with a second control character and the combined control characters may be utilized for lane alignment. For example, in a case where a second lane alignment character such as /A'/ is utilized, then the /A/ and /A'/ characters may be simultaneously utilized for lane alignment. The /A'/ control character may be any one of the other available control characters in the protocol.

In order to add encoded information, the control character /A/ may represent logic "1" and the control character /A'/ may represent logic "0". As a result, the two control characters /A/ and /A'/ may be utilized for lane alignment and as four additional bits of information that may be transmitted. Accordingly, the /A/ and the /A'/ control characters may utilize spare link bandwidth. The following table illustrates possible combinations for the control characters /A/, /A'/ for a XAUI.

|    | LANE 0 | LANE 1 | LANE 2 | LANE 3 |
|----|--------|--------|--------|--------|
| 0  | /A/    | /A/    | /A/    | /A/    |
| 1  | /A/    | /A/    | /A/    | /A'/   |
| 2  | /A/    | /A/    | /A'/   | /A/    |
| 3  | /A/    | /A/    | /A'/   | /A'/   |
| 4  | /A/    | /A'/   | /A/    | /A/    |
| 5  | /A/    | /A'/   | /A/    | /A'/   |
| 6  | /A/    | /A'/   | /A'/   | /A/    |
| 7  | /A/    | /A'/   | /A'/   | /A'/   |
| 8  | /A'/   | /A/    | /A/    | /A/    |
| 9  | /A'/   | /A/    | /A/    | /A'/   |
| 10 | /A'/   | /A/    | /A'/   | /A/    |
| 11 | /A'/   | /A/    | /A'/   | /A'/   |
| 12 | /A'/   | /A'/   | /A/    | /A/    |

-continued

|    | LANE 0 | LANE 1 | LANE 2 | LANE 3 |
|----|--------|--------|--------|--------|
| 13 | /A'/   | /A'/   | /A/    | /A'/   |
| 14 | /A'/   | /A'/   | /A'/   | /A/    |
| 15 | /A'/   | /A'/   | /A'/   | /A'/   |

For example, if the lane alignment characters transmitted in each lane are, lane 0: /A'/, lane 1: /A/, lane 2: /A/ and lane 3: /A'/, this may represent the four (4) bits of information 0, 1, 1, 0. With four (4) bits, there are $2^4$ or 16 possible combinations that may be encoded, each of which may be utilized to represent a different unit of information. In one aspect of the invention, the four (4) bits of lane alignment control characters may be encoded in order to transmit status information or other system information, for example. The following table illustrates exemplary logic assignments for various combinations of control characters /A/, /A'/ for a XAUI as described in the table above.

|    | LANE 0 | LANE 1 | LANE 2 | LANE 3 |
|----|--------|--------|--------|--------|
| 0  | 1      | 1      | 1      | 1      |
| 1  | 1      | 1      | 1      | 0      |
| 2  | 1      | 1      | 0      | 1      |
| 3  | 1      | 1      | 0      | 0      |
| 4  | 1      | 0      | 1      | 1      |
| 5  | 1      | 0      | 1      | 0      |
| 6  | 1      | 0      | 0      | 1      |
| 7  | 1      | 0      | 0      | 0      |
| 8  | 0      | 1      | 1      | 1      |
| 9  | 0      | 1      | 1      | 0      |
| 10 | 0      | 1      | 0      | 1      |
| 11 | 0      | 1      | 0      | 0      |
| 12 | 0      | 0      | 1      | 1      |
| 13 | 0      | 0      | 1      | 0      |
| 14 | 0      | 0      | 0      | 1      |
| 15 | 0      | 0      | 0      | 0      |

The first exemplary combination or encoding, namely 0, which has lane 0: /A/, lane 1: /A/, lane 2: /A/ and lane 3: /A/ may represent the standard assignment for lane alignment. However, the remaining encoded combinations, namely 1 through 15, may represent expanded or additional assignments that may be utilized for communicating status or other system information.

Figure 7:
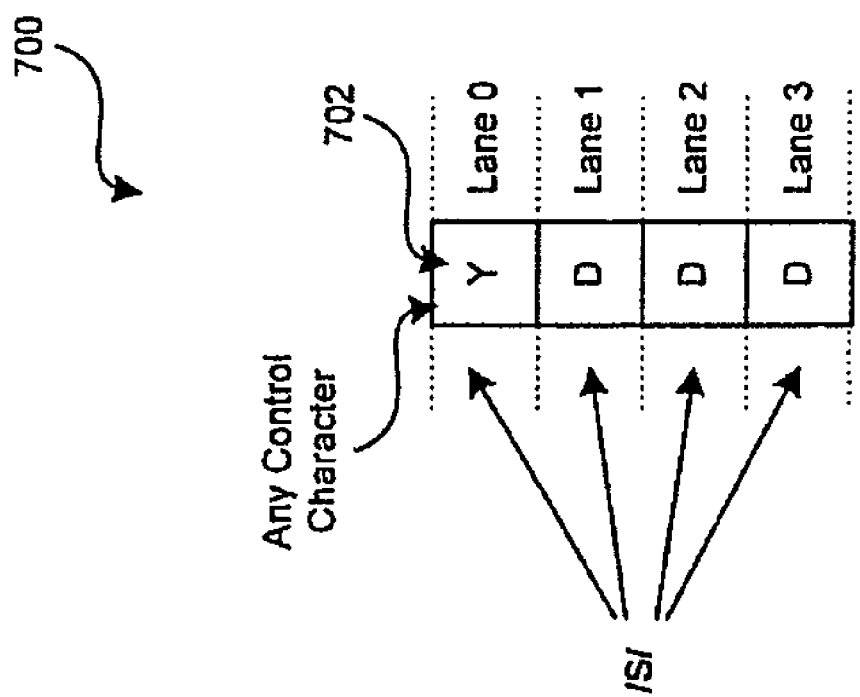
FIG. 7 is a diagram illustrating an embodiment of the enhanced encoding method of FIG. 6 specifically showing the encoding of a start-of-packet control character /S/ in accordance an embodiment of the present invention.

In another embodiment of the invention, a start-of-packet (SOP) control character, which may be represented as a /S/ control character, may also be encoded. FIG. 7 is a diagram 700 illustrating an embodiment of the enhanced encoding method of FIG. 6 specifically showing the encoding of a start-of-packet control character /S/ in accordance with the embodiment of the present invention. The start-of-packet control character /S/, may normally appear in lane 0 of a multilane communication channel structure. The start-of-packet control character /S/ may be utilized to signify the start of a next data packet, symbol or codeword by itself. Referring to FIG. 5, reference 506 depicts a start-of-packet control character /S/.

In one embodiment of the invention, any control character in an existing control character set may be utilized to define an expanded or new start-of-packet control character that may represent the start of a next packet. Referring to FIG. 7, the expanded or new start-of-packet character may be represented by /Y/, for example. The expanded or new start-of-packet control character is referenced by 702. The expanded or new start-of-packet control character 702 may represent the start of a new packet and may be located or placed in the first lane, lane 0. The expanded start-of-packet control character 702 may be succeeded by or followed by data words, /D/, in each of the successive lanes, lane 1, lane 2 and lane 3. As a result, each unique control character /Y/ in a start-of-packet lane sequence may represent a different unit of information. For example, if there are 12 control characters in the control character set, then 11 additional units of information may be communicated as part of a start-of-packet control character. Notwithstanding, the additional units of information or expanded start-of-packet control characters may utilize spare link bandwidth.

Figure 8:
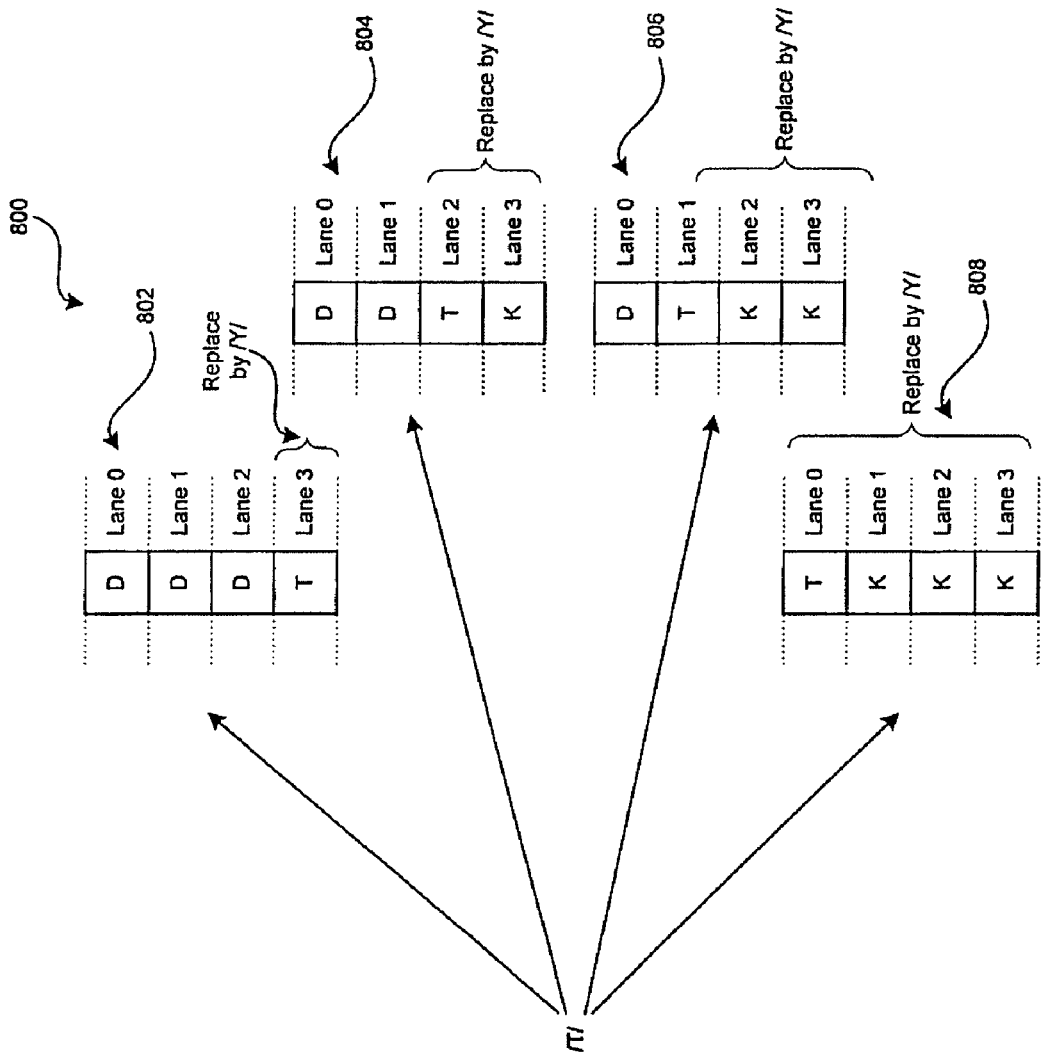
FIG. 8 is a diagram illustrating an embodiment of the enhanced encoding method of FIG. 6 specifically showing the encoding of an end-of-packet control character /T/, in accordance with an embodiment of the present invention.

In another embodiment of the invention, an end-of-packet (EOP) control character, which may be represented as a /T/ control character, may also be encoded. FIG. 8 is a diagram 800 illustrating an embodiment of the enhanced encoding method of FIG. 6 specifically showing the encoding of an end-of-packet control character /T/, in accordance with an embodiment of the present invention. The end-of-packet control character /T/, may appear in any lane of a multi-lane structure and may be preceded by data words /D/ and/or followed by comma control characters /K/. The end-of-packet control character /T/ may also be utilized to define the end of a current data packet, symbol or control word all by itself. Although /T/ and /K/ control characters are illustrated in FIG. 8, the invention is not so limited and any other control characters in the existing control character set may be utilized.

In accordance with an aspect of the invention, whenever an end-of-packet control character is preceded by data words /D/, subsequent end-of-packet control characters /T/ and/or comma control characters /K/ may be encoded as any available control character such as /Y/. For example, referring to FIG. 8, in a case where there are four (4) lanes and the end-of-packet sequence would be lane 0: /D/, lane 1: /D/, lane 2: /D/, and lane 3: /T/, as referenced by 802, then the /T/ in lane 3 may be encoded as any available control character /Y/. This may result in expanded or additional control characters that may provide additional units of information, which communicates status or other system information. The additional units of information or expanded end-of-packet control characters effectively utilize spare link bandwidth.

Similarly, in instances where the end-of-packet sequence would be lane 0: /D/, lane 1: /D/, lane 2: /T/ and lane 3: /K, as referenced by 504, then the /T/ control character in lane 2 and the control character /K/ in lane 3 may be encoded with any combination of available control characters. This may result in expanded or additional control characters and may provide additional units of information that communicates status or other system information. The additional units of information or expanded end-of-packet control characters may utilize spare link bandwidth.

Additionally, in instances where the end-of-packet sequence would be lane 0: D, lane 1: /T/, lane 2: /K/ and lane 3: /K/, as referenced by 806, then the /T/ control character in lane 1, the /K/ control character in lane 2, and the /K/ control character in lane 3 may be encoded with any combination of available control characters. In this regard, the sequence of two (2) /K/ control characters in lane 2 and lane 3 may be encoded as two (2) bits of additional information. For example, the two (2) /K/ control characters may be encoded as /K/ or /K'/ where /K'/ is a different control character from /K/ and may be one of the control characters in the existing control character set. In this manner, the /K/ control character may represent logic one (1) and the /K'/ may represent logic zero (0), thereby providing 2 bits of additional information in the EOP sequence. This may result in expanded or additional control characters and may provide additional units of information that communicates status or other system information. The additional units of information or expanded end-of-packet control characters may utilize spare link bandwidth.

Finally, in instances where the end-of-packet sequence would be lane 0: /T/, lane 1: /K/, lane 2: /K/ and lane 3: /K/, as referenced by 508, then the sequence of three (3) /K/ control characters in lane 1, lane 2 and lane 3 may be encoded as three (3) bits of additional information. Again, this may result in expanded or additional control characters and may provide additional units of information that communicates status or other system information. The additional units of information or expanded end-of-packet control characters may utilize spare link bandwidth. For example, the three (3) /K/ control characters may be encoded as /K/ or /K'/ where /K'/ is a different control character from /K/ and may be one of the control characters in the existing control character set. In this manner, the /K/ control character may represent logic one (1) and the /K'/ may represent logic zero (0), thereby providing 3 bits of additional information in the EOP sequence. Other encoding schemes for this EOP sequence may be implemented without departing from the spirit or essence of the various embodiments of the present invention.

Figure 9:
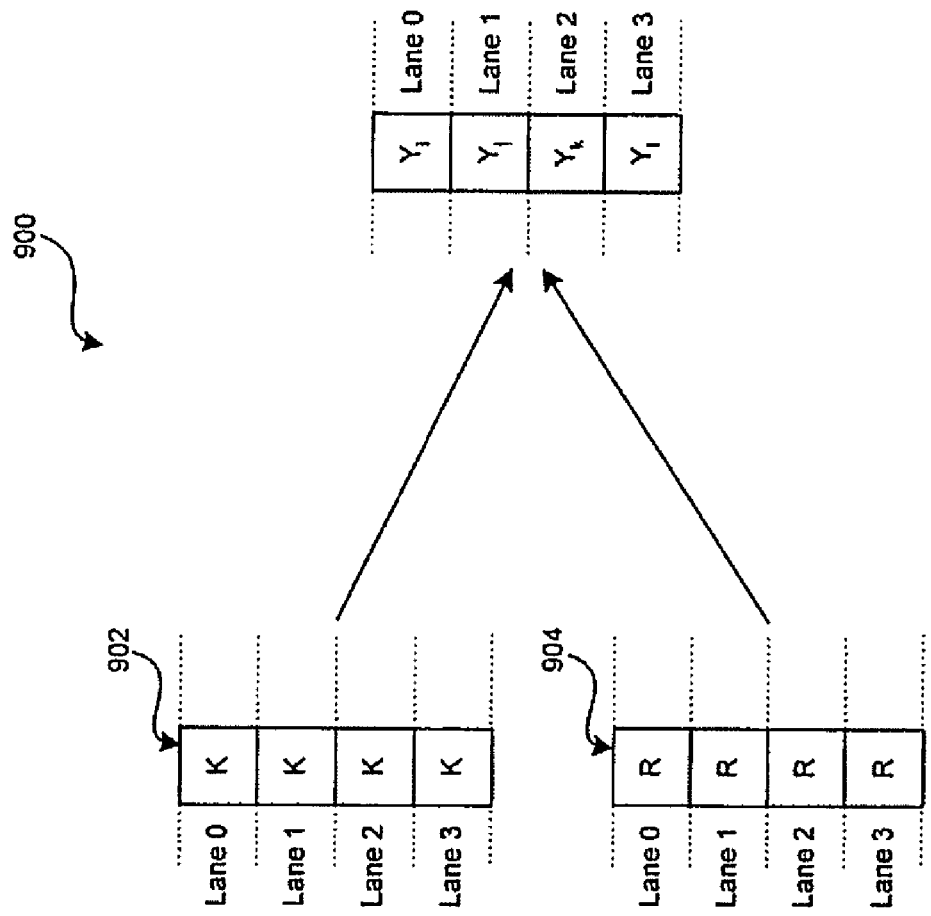
FIG. 9 is a diagram illustrating an embodiment of the enhanced encoding method of FIG. 6 specifically showing the encoding of control characters in an inter-packet-gap, in accordance with an embodiment of the invention.

Another embodiment of the invention may provide encoding of control characters in an idle or inter packet gap (IPG). FIG. 9 is a diagram 900 illustrating an embodiment of the enhanced encoding method of FIG. 6 specifically showing the encoding of control characters in an inter-packet-gap, in accordance with an embodiment of the invention. An inter-packet-gap or idle control character may occur between two data packets in a multilane communication channel. The inter-packet-gap may include comma control characters /K/ and carrier extend control characters /R/. In general, the inter-packet-gap control characters may be the same in any given column of a parallel multilane channel structure. Referring to FIG. 5, reference 508 depicts an idle or inter-packet-gap control character.

Within an inter-packet-gap, a column of control characters across the parallel lanes of a multilane communication channel may be encoded using any combination of available control characters such as /Y/ in accordance with an embodiment of the invention. This may result in expanded or additional inter-packet-gap control characters and may provide additional units of information that communicates status or other system information. The additional units of information or expanded inter-packet-gap control characters may utilize spare link bandwidth. In a further aspect of the invention, multiple columns of control characters within an inter-packet-gap may also be encoded in a similar manner to add even more information to the inter-packet-gap.

Referring to FIG. 9, a column containing /K/ control characters 902, which may represent an inter-packet-gap or idle control character, may be encoded using any combination of control characters in the control character set. In this regard, /Y/ may represent a selected control character from the control character set. Possible combinations of the selected control character /Y/ may be represented by /$Y_i$/, /$Y_j$/, /$Y_k$/ and /$Y_l$/. Similarly, a column containing /R/ control characters 904, which may represent an inter-packet-gap or idle control character, may be encoded using any combination of control characters in the control character set. Accordingly, the /R/ control characters may be encoded using any possible combinations and may be represented by /$Y_i$/, /$Y_j$/, /$Y_k$/ and /$Y_l$/.

Figure 10:
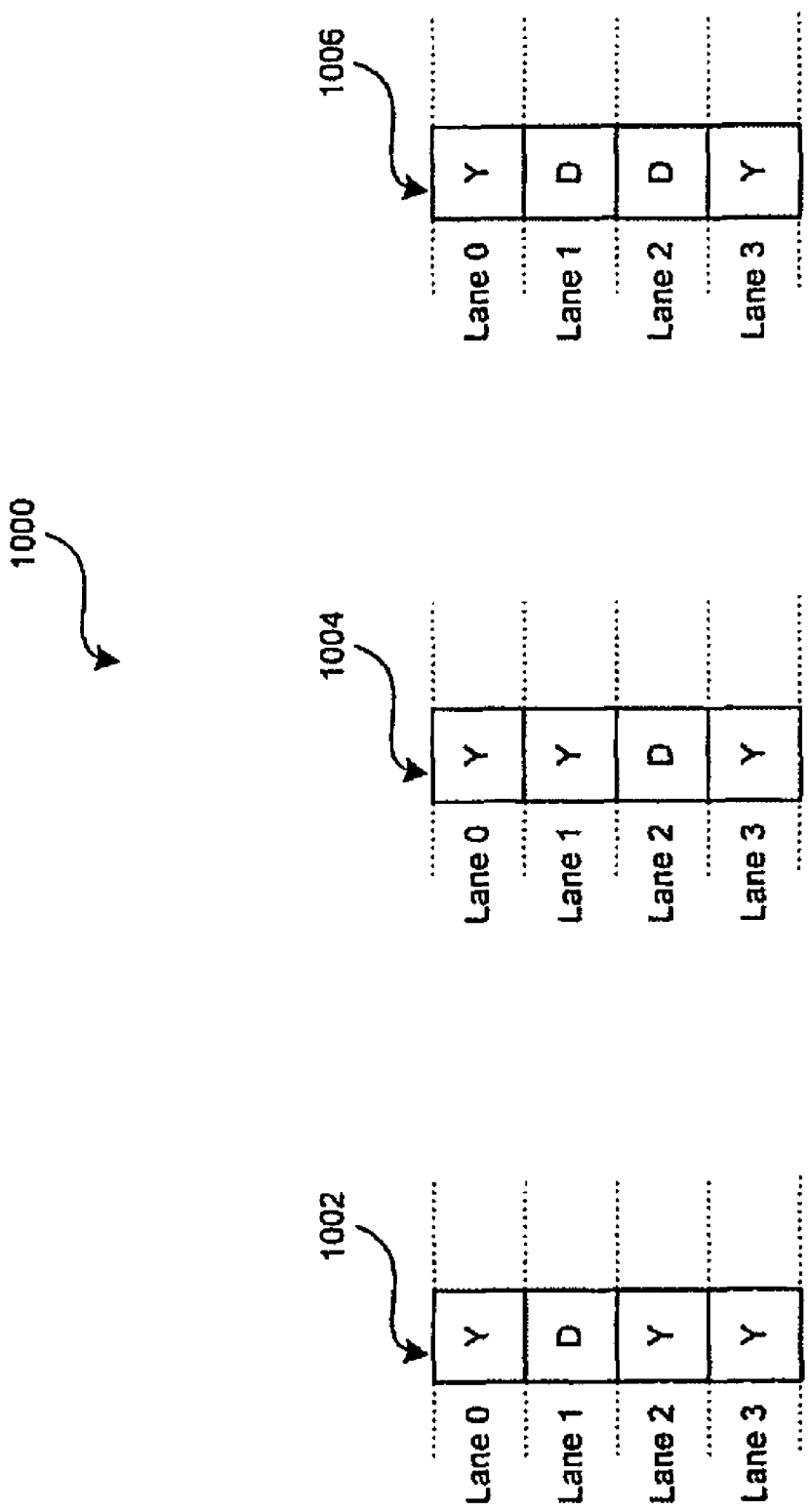
FIG. 10 is a diagram illustrating an embodiment of the enhanced encoding method of FIG. 6 specifically showing the encoding of data words bounded by control characters, in accordance with an embodiment of the invention.

Another embodiment of the invention may include the creation or generation of new columns of control characters, data words, code words and/or symbols, which may be placed in a multilane communication channel. FIG. 10 is a diagram 1000 illustrating an embodiment of the enhanced encoding method of FIG. 6 specifically showing the encoding of data words bounded by control characters, in accordance with an embodiment of the invention. In FIG. 10, newly created columns of control characters /Y/ and data words /D/ may be inserted into a multilane datastream for a communication channel.

Referring to FIG. 10, three (3) exemplary configuration columns 1002, 1004 and 1006, of data words /D/ bounded by control characters /Y/ are illustrated. Expanded information may be encoded in the data words /D/ and may be bounded by control characters /Y/. The control characters /Y/ may be any combination of control characters in the control character set. Certain configurations of control characters /Y/ and data words /D/ may define specific types of communicated information. Accordingly, this may result in additional control characters and may provide additional units of information that may communicate status or other system information. The additional units of information or expanded control characters may utilize spare link bandwidth.

For example, configuration column 1002 illustrates lane 0: /Y/, lane 1: /D/, lane 2: /Y/ and lane 3: Y and configuration column 1004 illustrates lane 0: /Y/, lane 1: /Y/, lane 2: /D/ and lane 3: /Y/. The configuration column 1006 having lane 0: /Y/, lane 1: /D/, lane 2: /D/ and lane 3: /Y/ may be generated to represent two bytes of status information such as error information. If each data word /D/ is 8 bits, for example, then each /D/ may be encoded to provide up to 28 or 256 different units of information. The newly encoded configuration columns 1002, 1004 and 1006 illustrate /D/ data words bounded by control characters /Y/. The new columns of added information may be inserted in the parallel lane structure of a multilane channel. In this regard, the new columns and added information may be inserted within data packets and/or within inter-packet-gaps, for example. The insertion of new columns of added information may result in the additional bytes being added to the parallel datastream in the multilane channel. However, the additional bytes are added to the parallel data stream such that the additional information that is carried by the additional bytes out weighs the overhead associated with the additional bytes.

Other embodiments that may take advantage of spare link bandwidth may also be implemented. For example, the /K/ control character may comprise seven (7) fixed bits and three (3) don't care bits (xxx) according to 8B/10B encoding protocol, thereby resulting in a codeword of 0011111xxx. The protocol may be modified such that the three (3) don't care bits xxx, may be encoded with $2^3$ or 8 different units of additional information in accordance with an embodiment of the present invention. Notwithstanding, although a XAUI is utilized to illustrate various embodiment or aspects of the invention, the enhanced encoding methods are applicable to other encoding schemes that may utilize multiple lanes, in accordance with various embodiments of the present invention.

Figure 11:
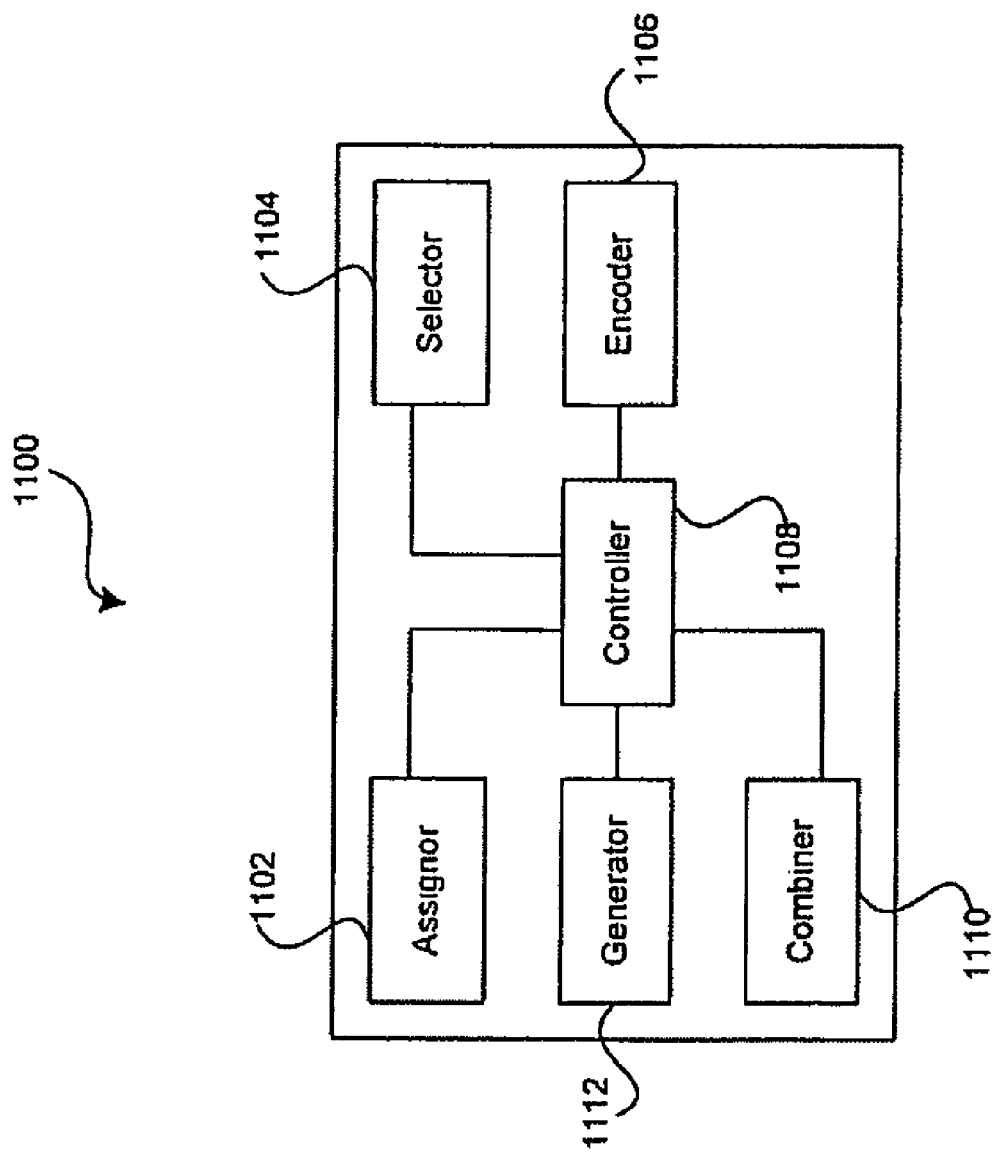
FIG. 11 is a block diagram of an exemplary system 800 for encoding data in a multilane communication channel in accordance with an embodiment of the invention.

FIG. 11 is a block diagram of an exemplary system 1100 for encoding data in a multilane communication channel in accordance with an embodiment of the invention. The system 1100 may include an assignor 1102, a selector 1104, an encoder 1106, a controller 1108, a combiner 1110 and a generator 1112. Referring to FIG. 11, the generator 1112 may generate from existing control characters in a character set, expanded control characters utilized for controlling the data in each lane of the multilane communication channel. The controller 1108 may control at least one of the lanes of the multilane communication channel using at least one of the generated control characters. The selector 1104 may select a second control character from any other of the existing control characters if a first control character of the existing control characters is an alignment character. The combiner 1110 may combine the first control character with the second control character to generate a third control character. Each of the combination of the combined first control character and the second control character may represent the expanded control character. The assignor 1102 may assign a first logic level to the first control character and to assign a second logic level to the second control character. The first logic level and the second logic level is one of logic zero (0) and logic (1).

In another aspect of the invention, the selector 1104 may select a second control character from any other of the existing control characters if a first control character of the existing control characters is a start-of-packet control character. The selected second control character may indicate the start of a packet. The controller 1108 may place the second control character in a first lane of the multilane communication channel. The controller 1108 may also determine which lane of the multilane communication channel contains an end-of-packet control character.

The selector 1104 may select at least one other control character from the existing control character set if the end-of-packet control character is preceded by at least one control character in a lane of the multilane communication channel. The encoder 1106 may encode the selected at least one other control character as the end-of-packet control character. The selector 1104 may select at least one other control character from the existing control character set if the end-of-packet control character is succeeded by at least one comma control character in a lane of the multilane communication channel. The encoder 1106 may encode the selected control character as the comma control character. The generator 1112 may generate combinations of the encoded control character. The assignor 1102 may assign a unique value to each of the generated combinations of the encoded control character. Each of the assigned unique value may represent an expanded control character.

In another aspect of the invention, the controller 1108 may determine at least one lane of the multilane communication channel that has an inter-packet-gap control character. The selector 1104 may select any combination of control characters from the existing control character set. The encoder 1106 may encode a column of the multilane communication channel corresponding to the determined lane with the selected any combination of control characters. The generator 1112 may generate at least one column bearing, for example a data word, bounded by control characters selected from the existing control character set. The encoder 1106 may encode at least a first lane and a last lane of at least one column of the multilane communication channel with the control characters selected from the existing control character set. In accordance with the various embodiments of the invention, the expanded control character may utilizing spare link bandwidth. The existing control characters may be a configuration character, an idle character or an encapsulation character, for example.

In another embodiment of the invention, the /S/ control character may be further employed to utilize unused bandwidth. In this regard, the ISI control character may not be limited to lane 0, but may be utilized in other lanes as well. For example, in a four (4) lane XAUI arrangement, the ISI control character may occur in lanes 1, 2 and/or 3. Accordingly, in the four (4) lane XAUI system, there would be two (2) additional bits of information that may be passed depending on the lane in which lane the /S/ control character is located. For example, lane 0 may be represented by binary 00, lane 1 by binary 01, lane 2 by binary 10 and lane 3 by binary 11.

Further description of the foregoing spare bandwidth technique is described in U.S. patent application Ser. No. 10/454,012, owned by the present assignee, and incorporated herein by reference. An alternate method of utilizing spare link bandwidth is described in U.S. patent application Ser. No. 10/454,273, also assigned to the owner of this patent application. That technique embeds information by coding the opposite sign of running disparity than what would normally be expected on an 8B10B or other coding algorithm. The reversed coding is detected as a "1" or "0" at the word level and can be combined over a series of words to generate additional control signals without consuming bandwidth An example or load balancing will now be described. Referring to FIG. 1, blade server #1 103, in the process of transmitting a message to the common switch-blade 102, may transmit its utilization information embedded within the spare link bandwidth of the message.

In accordance with various embodiments of the present invention, utilization information may comprise blade server CPU percent utilization, blade server interrupt utilization, or any other load indicators that may be gathered from a hardware point-of-view from a blade server. In accordance with another embodiment of the present invention, utilization information may comprise the number of active sessions currently being serviced by a blade server.

Figure 12:
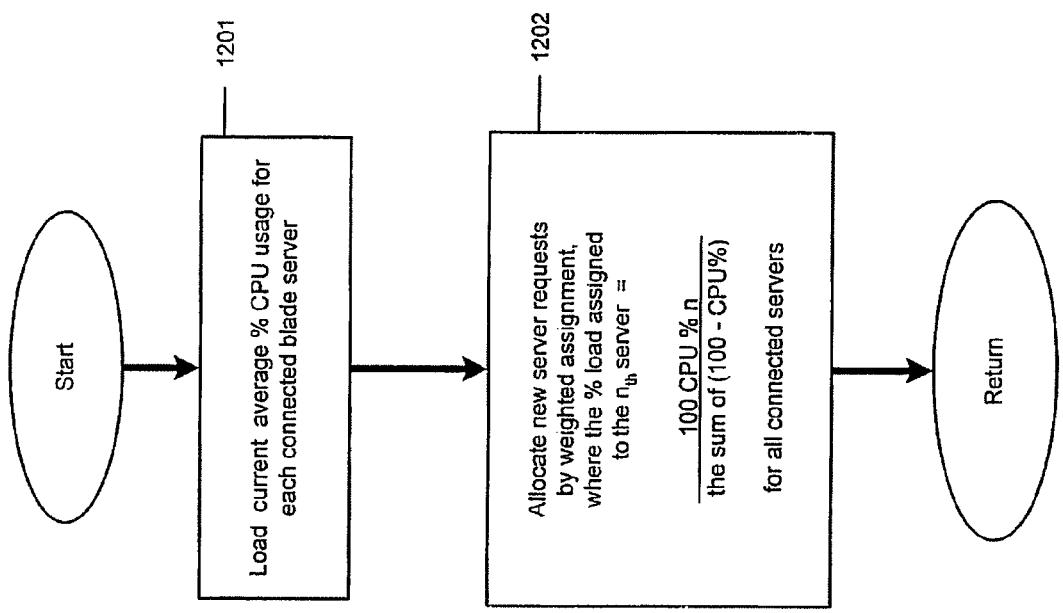
FIG. 12 is a flowchart illustrating a capacity utilization algorithm that may be used with the invention.

In one embodiment, hardware information corresponding to blade server utilization is gathered within each blade server and transmitted to the switch-blade in real time. In such an embodiment, the load balancing algorithm 201 may continuously update the load distribution 203, establishing maximum efficiency of the blade servers within the multi-server platform 101. An algorithm that could be used is shown in FIG. 12, where the amount of load allocated to each blade is determined by taking the ratio of excess percent CPU availability for each blade divided by the sum of excess CPU capacity for all available blades.

In accordance with an embodiment of the present invention, the multiple blade servers (#1 to #N) may each provide a plurality of functions via the external network 106. Alternatively, each of the multiple blade servers (#1 to #N) may be dedicated to providing a different, specific function via the external network 106.

In summary, a method and system provides blade server load balancing using spare link bandwidth in a multi-server platform having a single switch backplane. A load balancing algorithm within a switch-blade, acting as a blade server manager, is used to generate a load distribution of server traffic based on utilization information provided by the blade servers. The utilization information is conveyed from the blade servers to the switch-blade by embedding the utilization information in the spare link bandwidth of messages communicated between the blade servers and the switch-blade in the course of normal operation. The embedded utilization information does not add significantly to the load on the servers.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. A method for providing blade server load balancing using spare link bandwidth in a multi-server platform having a common backplane, comprising:
   receiving digital information on a digital communications link at a blade server manager;
   receiving capacity utilization information embedded in spare link bandwidth from a plurality of blade servers operably coupled to the blade server manager;
   selecting a blade server to receive said digital information based on the received capacity utilization information; and
   forwarding the received digital information to the selected blade server.

2. The method of claim 1, wherein said embedded capacity utilization information is data representing blade server CPU percent utilization.

3. The method of claim 1, wherein said embedded capacity utilization information is data representing blade server interrupt utilization.

4. The method of claim 1, wherein the blade server manager is operably coupled to an Ethernet network.

5. The method of claim 1, wherein the blade server manager is operably coupled to an external network.

6. The method of claim 1, wherein the blade server manager is operably coupled to an external network at a link data rate of 10 Gigabits per second.

7. The method of claim 1, wherein the blade server manager communicates with each blade server over a dedicated link.

8. The method of claim 7, wherein the data rate of the dedicated link is 1 Gigabit/second.

9. The method of claim 1, wherein the blade server utilization information is embedded in frame alignment information.

10. The method of claim 9, wherein the embedded capacity information is represented with at least two symbols.

11. The method of claim 9, wherein the embedded capacity information is represented with expanded control characters.

12. The method of claim 1, wherein the selecting is based on a load balancing algorithm.

13. A blade server with load balancing using spare link bandwidth, comprising:
   a server including a blade server manager, two or more blade servers, and a common backplane;
   a network interface for communicating with an external network; and
   two or more blade server interfaces for communicating between the blade server manager and each blade server,
   wherein said blade server manager allocates data received from said external network to each blade server based on embedded capacity utilization data transmitted by each blade server to the blade server manager that is embedded in spare link bandwidth on said interface between the blade server manager and each of said blade servers.

14. The system of claim 13, wherein said embedded capacity utilization data information is data representing blade server CPU percent utilization.

15. The system of claim 13, wherein said embedded capacity utilization data represents blade server interrupt utilization.

16. The system of claim 13, wherein the blade server manager is operably coupled to an Ethernet network.

17. The system of claim 13, wherein the blade server manager is operably coupled to an external TCP/IP network.

18. The system of claim 13, wherein the blade server manager is operably coupled to an external network with a communications link having a data rate of 10 Gigabits per second.

19. The system of claim 13, wherein the blade server manager communicates with each blade server over a dedicated link having a data rate of 1 Gigabit/second.

20. The system of claim 13, wherein the blade server utilization information is embedded in frame alignment information.

21. The system of claim 13, wherein the embedded capacity information is represented with at least two symbols.

22. The system of claim 13, wherein the embedded capacity information is represented with expanded control characters.

23. The system of claim 13, wherein said blade server allocates data received from said external network to each blade server using a load balancing algorithm, and wherein said load balancing algorithm utilizes said embedded capacity utilization data.

24. The system of claim 13, wherein said capacity utilization data is embedded in an inter packet gap.

25. The system of claim 13, wherein said capacity utilization data is embedded in one or more control words bounding a data word.

* * * * *